United States Patent [19]
Yuze

[11] Patent Number: 5,404,924
[45] Date of Patent: Apr. 11, 1995

[54] MOTORCYCLE TIRE WITH SPIRALLY WOUND BELT

[75] Inventor: Toshifumi Yuze, Nishinomiya, Japan

[73] Assignee: Sumitomo Rubber Industries, Ltd., Kobe, Japan

[21] Appl. No.: 248,156

[22] Filed: May 24, 1994

Related U.S. Application Data

[63] Continuation of Ser. No. 956,092, Oct. 2, 1992, abandoned.

[30] Foreign Application Priority Data

Oct. 14, 1991 [JP] Japan .................. 3-294945

[51] Int. Cl.$^6$ .................. B60C 9/18; B60C 9/20; B60C 9/22
[52] U.S. Cl. .................. 152/530; 152/526; 152/527; 152/531; 152/536
[58] Field of Search .................. 152/526–527, 152/531, 533, 536, 530

[56] References Cited

U.S. PATENT DOCUMENTS

| | | | |
|---|---|---|---|
| 4,073,330 | 2/1978 | Allard | 152/536 X |
| 4,293,019 | 10/1981 | Maiocchi | 152/531 X |
| 5,032,198 | 7/1991 | Kojima et al. | 152/533 X |

FOREIGN PATENT DOCUMENTS

| | | | |
|---|---|---|---|
| 264889 | 9/1963 | Australia | 152/536 |
| 0335588 | 10/1989 | European Pat. Off. | |
| 0400859 | 12/1990 | European Pat. Off. | 152/533 |
| 0414406 | 2/1991 | European Pat. Off. | |
| 0422881 | 4/1991 | European Pat. Off. | 152/531 |
| 56-112304 | 9/1981 | Japan | 152/536 |
| 6483406 | 3/1989 | Japan | 152/536 |
| 2-92705 | 4/1990 | Japan | 152/526 |
| 3-74205 | 3/1991 | Japan | 152/531 |

Primary Examiner—Michael W. Ball
Assistant Examiner—Adrienne C. Johnstone

[57] ABSTRACT

A motorcycle tire which comprises a carcass (6) extending between tire bead portions (4), and a belt (7) disposed radially outside the carcass, wherein the belt (7) is formed by spirally winding at least two reinforcing members (11 and 12) having different elastic moduli so that the lower elastic modulus reinforcing member (11) and the higher elastic modulus reinforcing member (12) serially appear in the widthwise direction of the belt.

6 Claims, 6 Drawing Sheets

MOTORCYCLE TIRE WITH SPIRALLY WOUND BELT

This application is a continuation of application Ser. No. 07/956,092, filed on Oct. 2, 1992, now abandoned.

The present invention relates to a pneumatic tire more particularly to a motorcycle tire having an improved belt structure.

BACKGROUND OF THE INVENTION

Recently, in order to improve tire performance during high speed running, spiral belts are widely used in radial tires, especially four-wheeled vehicle tires, e.g. passenger car tires.

In a motorcycle tire, the tread and carcass have curved profiles with a relatively small radius of curvature in comparison with four-wheeled vehicle tires. Therefore, a belt to be disposed between the tread and carcass must have a curved profile with a small radius of curvature.

To make a spiral belt for such motorcycle tire, a belt cord must be spirally wound on a curved face which is generally the radially outer surface of the carcass. Therefore, the windings are liable to be dislocated.

On the other hand, in order to obtain a desired belt effect, the cord count is varied. If spaces are provided between the windings to adjust the cord count, the windings are easily dislocated and loosened. Thus, the cord winding operation is very difficult. Even if such dislocation and looseness could be avoided, the cord spacings are liable to be disturbed during the tire building operation, and accuracy can not be achieved, and thereby high speed performance can not improved.

In the conventional spiral belts, therefore, to avoid such problems, a belt cord (a) is wound compactly, that is, without cord spacings as shown in FIG. 8. In this case, the cord count is determined by only the cord diameter. Therefore, to adjust belt characteristics, the material, denier, twist and/or structure of the belt cord itself have to be changed. As a result, the adjustable range and the design freedom are restricted.

SUMMARY OF THE INVENTION

It is therefore, an object of the present invention to provide a pneumatic tire having a spiral belt structure capable of achieving great accuracy and providing wide adjustable ranges for belt characteristics such as belt rigidity.

According to one aspect of the present invention, a motorcycle tire comprises a carcass extending between tire bead portions, and a belt disposed radially outside the carcass, wherein the belt is formed by spirally winding at least two reinforcing members having different elastic moduli so that the lower elastic modulus reinforcing member(s) and the higher elastic modulus reinforcing member(s) serially appear in the widthwise direction of the belt.

Therefore, the lower modulus reinforcing member mainly functions as a distance piece for providing a certain distance between the windings of the higher modulus reinforcing member, while the higher modulus reinforcing member functions as the real reinforcing member. Accordingly, by varying the ratio of the number of the lower modulus reinforcing member to that of the higher modulus reinforcing member, the effective cord count can be widely and easily varied without providing actual spaces between the windings, and thereby the dislocation and looseness thereof are effectively prevented and great accuracy can be achieved.

BRIEF DESCRIPTION OF THE DRAWINGS

Embodiments of the present invention will now be described in detail in conjunction with the accompanying drawings, in which.

DETAILED DESCRIPTION OF THE EMBODIMENTS

Figure 1:
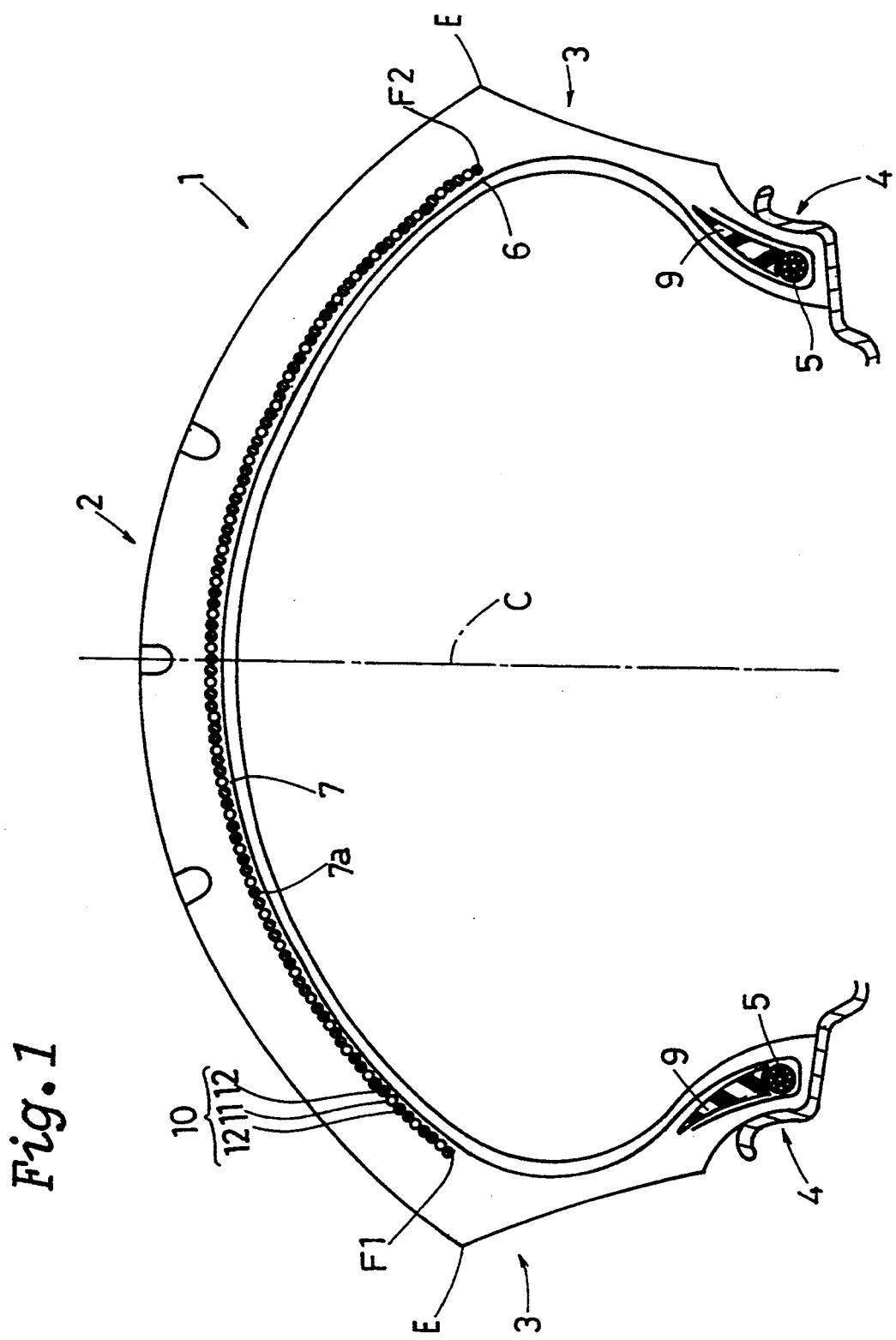
FIG. 1 is a cross sectional view of an embodiment of the present invention.

In FIGS. 1–4, a motorcycle tire 1 according to the present invention has a tread portion 2 having a pair of tread edges E, a pair of axially spaced bead portions 4, and a pair of sidewall portions 3 extending radially inwardly from the tread edges E to the bead portions 4.

The tread portion 2 is provided with a curved profile having a relatively small radius of curvature in comparison with that of tires in the other fields, e.g. passenger car tires, truck/bus tires, whereby the maximum cross sectional width of the tire lies between the above-mentioned tread edges E.

The tire 1 comprises a pair of bead cores 5 each disposed in each of the bead portions 4, a carcass 6 extending between the bead portions 4 and turned up around the bead cores 5 from the axially inside to outside thereof to form two turned up portions and one main portion of the carcass 6, a pair of bead apexes 9 each disposed radially outward of each bead core 5 and between the carcass main portion and each carcass turned up portion, and a belt 7 disposed radially outside the carcass 6 and inside the tread portion 2.

The carcass 6 has at least one ply, in this embodiment one ply, of cords arranged radially at an angle of 70 to 90 degrees with respect to the tire equator C to provide a radial or semiradial ply structure.

For the carcass cords, organic fiber cords, e.g. nylon, rayon, polyester, aromatic polyamide and the like are used.

The carcass 6 is provided in the crown portion with a curved profile similar to the tread profile.

The belt 7 comprises at least one ply, in this embodiment one ply 7a, of reinforcing members 10 wound on the radially outside of the carcass 6.

The above-mentioned reinforcing members 10 include at least one lower modulus reinforcing member 11 and at least one higher modulus reinforcing member 12.

The lower modulus reinforcing member 11 is composed of a lower elastic modulus cord 13 and a rubber coat 14 covering the cord 13.

The higher modulus reinforcing member 12 is composed of a higher elastic modulus cord 15 and a rubber coat 16 covering the cord 15.

The lower elastic modulus cord 13 has a lower elastic modulus than the higher elastic modulus cord 15.

Figure 2:
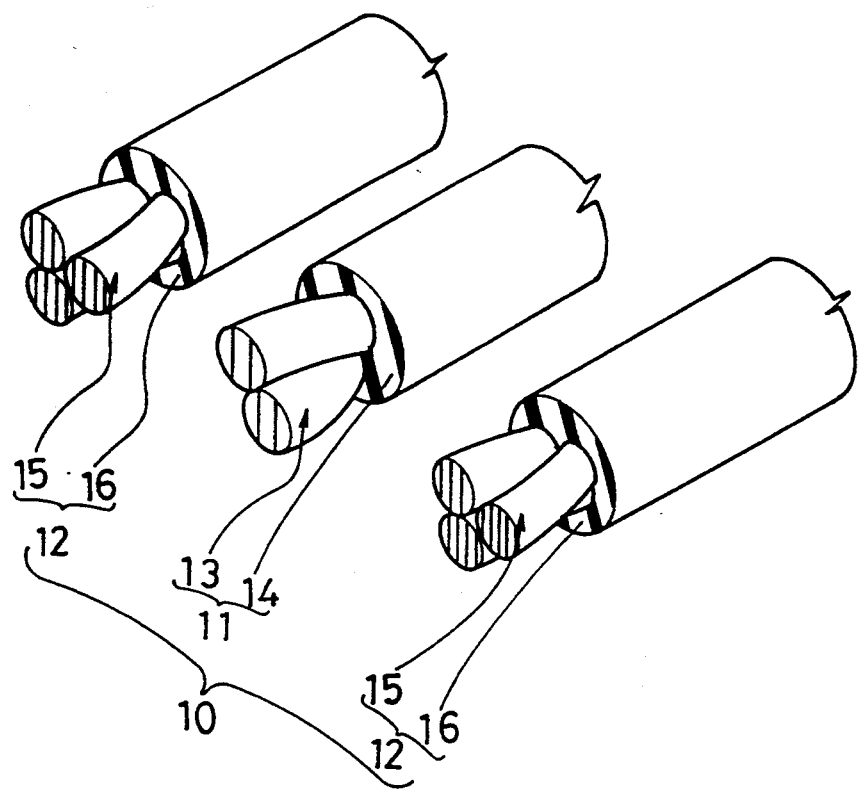
FIG. 2 is an enlarged schematic perspective view of the reinforcing members thereof.
Figure 3:
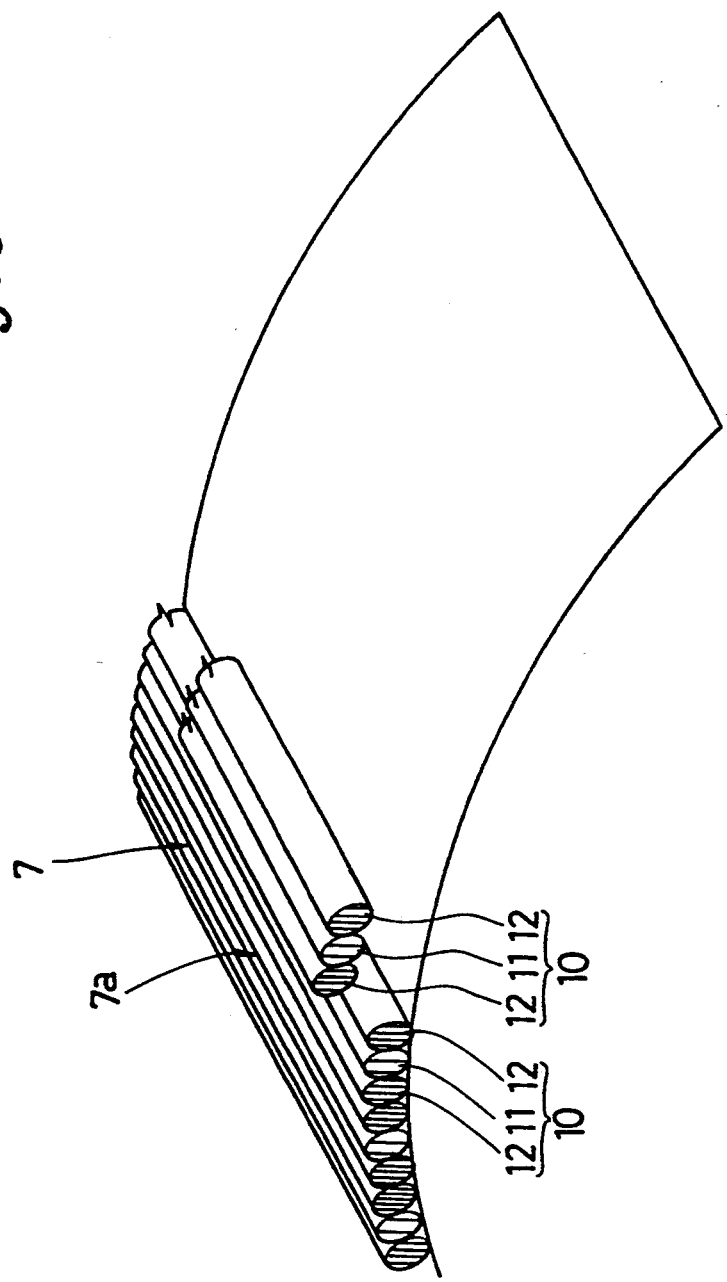
FIG. 3 is a partial perspective view of the belt showing an example of the arrangement of the reinforcing members.

The lower modulus cord 13 and the higher modulus cord 15 are each made of a plurality of strands twisted together as shown in FIG. 2. A strand can be a single monofilament or twisted fibers.

For the lower modulus cord 13, for example, low organic fiber cords, e.g. nylon, polyester, vinylon and the like having an elastic modulus of less than 1000 kgf/sq.mm are used. For the higher modulus cord 15, high modulus organic fiber cords, e.g. aromatic polyamide, aromatic polyester, carbon and the like, and steel cords, having an elastic modulus of not less than 1000 kgf/sq.mm are used.

The thickness of the rubber coat 14, 16 is such that the cord is completely covered therein. By varying the thickness, the cord spacings can be changed.

The reinforcing members 11 and 12 have a round cross sectional shape with a substantially same diameter.

The different modulus reinforcing members 11 and 12 are wound spirally on the curved crown portion of the carcass 6. The reinforcing members are wound compactly so that the axially adjacent windings contact each other, and that the lower modulus member 11 and the higher modulus member 12 appear serially in the widthwise direction of the belt.

In this embodiment, in order to form the belt ply 7a, one lower modulus reinforcing member 11 and two higher modulus reinforcing member 12 are wound spirally and continuously from one belt edge F1 to the other belt edge F2 so that the windings of the reinforcing members 11 and 12 are laid in parallel with each other and at small angles with respect to the tire equator C.

The belt ply 7a in this embodiment is formed by winding the above-mentioned three reinforcing members 11 and 12 at the same time in a state that the two higher modulus reinforcing members 12 are positioned one on each side of the lower modulus reinforcing member 11. Accordingly, the arrangement of the higher modulus member 12 and the lower modulus member 11 in the widthwise direction of the belt is as follows:

12—11—12—12—11—12—12—11—12—12—1-
1—12—

Thus, the higher modulus members 12 and the lower modulus member 11 appear serially in the belt widthwise direction.

Figure 4:
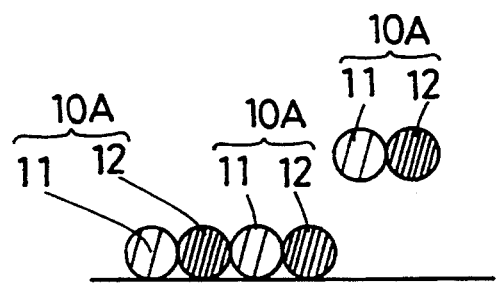
FIGS. 4 and 5 are cross sectional views each showing another example of the arrangement.

FIG. 4 shows another example of the arrangement, wherein to form a belt ply 7a, two reinforcing members 11 and 12 are wound at the same time. Accordingly, the arrangement is as follows:

11—12—11—12—11—12—11—12—11—12—1-
1—12—

Figure 5:
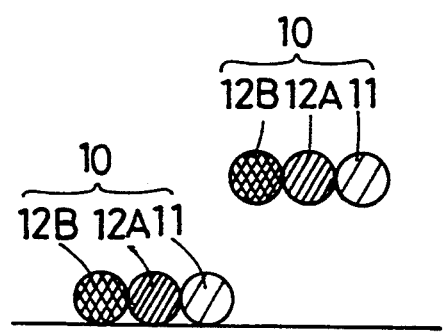

FIG. 5 shows still another example of the arrangement. In this example, three different elastic modulus reinforcing members 11, 12A and 12B are used.
The moduli are as follows: 11<12A<12B
The arrangement is as follows:

12B—12A—11—12B—12A—11—12B—12A—11—

For example, the lower modulus reinforcing member 11 includes a polyester fiber cord. The higher modulus reinforcing member 12A includes an aromatic polyamide fiber cord. The highest modulus reinforcing member 12B includes a steel cord.

In the above explained examples, the ratio of the number of the lower elastic modulus reinforcing member to the number of the higher elastic modulus reinforcing member is constant from one belt edge F1 to the other belt edge F2. However, the ratio can be varied as shown in FIG. 6.

Figure 6:
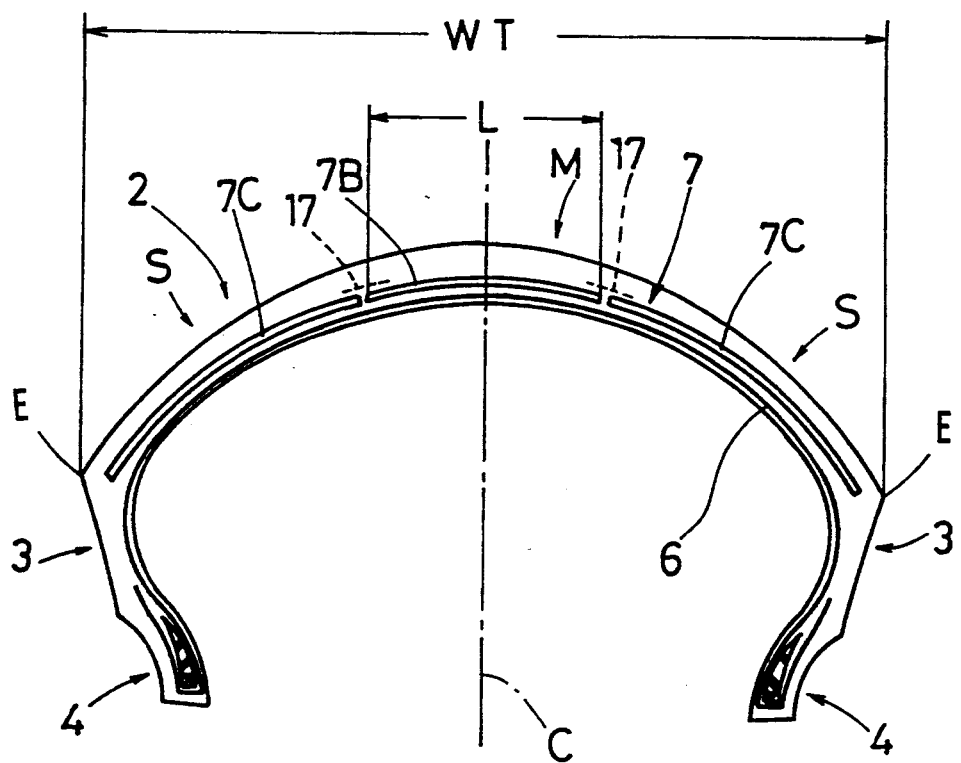
FIG. 6 is a cross sectional view of another embodiment of the present invention.

FIG. 6 shows another embodiment of the present invention, wherein the belt 7 is composed of three structurally different axial parts: a central part 7B and a pair of lateral parts 7C one on each side of the central part 7B.

The central part 7B has a width L of 0.2 to 0.4 times the tread width WT.

Figure 7:
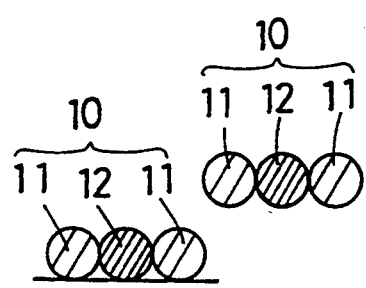
FIG. 7 is a cross sectional view of the reinforcing members in the central belt part thereof showing the arrangement of the reinforcing members therein.

The central part 7B is formed by spirally winding three reinforcing members: two lower modulus reinforcing members 11 and one higher modulus reinforcing member 12 disposed therebetween, as shown in FIG. 7. The arrangement is as follows:

11—12—11—11—12—11—11—12—11—

Each of the lateral parts 7C is formed by spirally winding three reinforcing members: two higher modulus reinforcing members 12 and one lower modulus reinforcing member 11 disposed therebetween as shown in FIG. 2. The arrangement is as follows:

12—11—12—12—11—12—12—11—12—

For the purpose of reinforcing the joint part between the central part 7B and each lateral part 7C, a reinforcing layer 17 can be disposed to overlap with both those parts 7B and 7C.

The belt 7 in this embodiment provides a larger rigidity for the shoulder regions than the tread crown region. Therefore, ride comfort during straight running is improved without deteriorating cornering stability.

Test tires of size 150/60R17 having the tire structure shown in FIG. 1 were prepared and tested using a sport type 250 cc motorcycle provided on the rear wheel with the test tire.

1) Straight running stability, cornering stability, maneuverability and ride comfort were evaluated by a skilled test driver.
2) Wear resistance: The running distance until the amount of the tread wear reached to 1 mm was measured as the wear resistance.

The test results are indicated in Table 1 by an index based on that the reference tire 1 is 100. The larger the index, the better the performance.

It was confirmed that the working example tire 1 was improved in ride comfort without deteriorating the other performance.

Similarly, test tires of size 170/60R17 having the tire structure shown in FIG. 1 were prepared and tested using a sport type 750 cc motorcycle provided on the rear wheel with the test tire.

The test results are indicated in Table 2 by an index based on that the reference tire 2 is 100. The larger the index, the better the performance.

The working example tire 2 was designed to improve running stability at a very high speed by reducing the tire deformation, and it was confirmed that the desired results can be obtained.

TABLE 1

Figure 8:
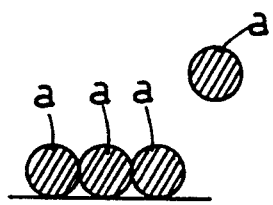
FIG. 8 is a cross sectional view explaining the prior art.

| Tire | Ex. 1 | Ref. 1 |
|---|---|---|
| Carcass | 1 ply | 1 ply |
| Cord material | nylon | nylon |
| Cord denier | 2/1260d | 2/1260d |
| Cord angle | 90 deg. | 90 deg. |
| Belt | 1 ply | 1 Ply |
| Structure | spiral | spiral |
| Higher modulus member | | |
| Cord material | aromatic polyamide | aromatic polyamide |
| Cord denier | 3/1500d | 3/1500d |
| Lower modulus member | | |
| Cord material | nylon | — |
| Cord denier | 2/1890d | — |
| Arrangement | FIG. 2 | FIG. 8 |
| Test Result | | |
| Straight running stability | 105 | 100 |
| Cornering stability | 100 | 100 |
| Maneuverability | 100 | 100 |
| Ride comfort | 110 | 100 |
| Wear resistance | 100 | 100 |

TABLE 2

| Tire | Ex. 2 | Ref. 2 | Ref. 3 |
|---|---|---|---|
| Carcass | 1 ply | 1 ply | 1 ply |
| Cord material | nylon | nylon | nylon |
| Cord denier | 2/1260d | 2/1260d | 2/1260d |
| Cord angle | 90 deg. | 90 deg. | 90 deg. |
| Belt | 1 ply | 1 ply | 1 ply |
| Structure | spiral | spiral | spiral |
| Higher modulus member | | | |
| Cord material | steel | — | steel |
| Cord denier | 3 × 3 × 0.15 | — | 3 × 3 × 0.15 |
| Lower modulus member | | | |
| Cord material | aromatic polyamide | aromatic polyamide | — |
| Cord denier | 3 × 1500d | 3 × 1500d | — |
| Arrangement | FIG. 4 | FIG. 8 | FIG. 8 |
| Test Result | | | |
| Straight running stability | 100 | 100 | 100 |
| Cornering stability | 100 | 100 | 95 |
| Maneuverability | 100 | 100 | 100 |
| Ride comfort | 95 | 100 | 90 |
| Wear resistance | 110 | 100 | 120 |

I claim:

1. A motorcycle tire comprising
a tread portion having a tread profile curved so that the maximum cross section width of the tire lies between the tread edges,
a carcass extending between tire bead portions, and
a belt disposed radially outside the carcass,
said belt having a central portion and a pair of lateral portions and each said portion being formed by spirally winding at least two reinforcing cords having different elastic moduli so that the reinforcing cords are disposed in a plurality of series in the widthwise direction of the belt, the reinforcing cords being wound compactly, wherein
the central portion has a width L of 0.2 to 0.4 times the tread width,
the ratio of the number of the lowest elastic modulus reinforcing cord to the number of the higher elastic modulus reinforcing cord is larger in the central portion of said belt than the lateral portions thereof, and
the central portion is structurally separated from each of the pair of lateral portions.

2. The motorcycle tire according to claim 1 wherein the reinforcing cords have a rubber coating.

3. A motorcycle tire comprising
a carcass extending between tire bead portions, and
a belt disposed radially outside the carcass,
said belt formed by spirally winding three reinforcing cords having different elastic moduli so that the three reinforcing cords are disposed in a plurality of series in the widthwise direction of the belt, the reinforcing cords being wound compactly.

4. The motorcycle tire according to claim 3 further comprising
a tread portion having a tread profile curved so that the maximum cross section width of the tire lies between the tread edges.

5. The motorcycle tire according to claim 3 wherein the reinforcing cords have a rubber coating.

6. A motorcycle tire comprising
a tread portion having a tread profile curved so that the maximum cross section width of the tire lies between the tread edges,
a carcass extending between tire bead portions, and
a belt disposed radially outside the carcass,
said belt having a central portion and a pair of lateral portions and each said portion being formed by spirally winding three reinforcing cords having different elastic moduli so that the reinforcing cords are disposed in a plurality of series in the widthwise direction of the belt, the reinforcing cords being wound compactly, wherein
the central portion has a width L of 0.2 to 0.4 times the tread width.

* * * * *